US012757199B2

(12) United States Patent
Elshafie et al.

(10) Patent No.: US 12,757,199 B2
(45) Date of Patent: Oct. 6, 2026

(54) PERFORMING ACTIONS FOR TRANSMISSIONS OF A DEVICE CAPABLE OF ENERGY HARVESTING

(71) Applicant: QUALCOMM Incorporated, San Diego, CA (US)

(72) Inventors: Ahmed Elshafie, San Diego, CA (US); Ahmed Attia Abotabl, San Diego, CA (US); Alexandros Manolakos, Athens (GR)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 18/691,256

(22) PCT Filed: Aug. 19, 2022

(86) PCT No.: PCT/US2022/075206
§ 371 (c)(1),
(2) Date: Mar. 12, 2024

(87) PCT Pub. No.: WO2023/086690
PCT Pub. Date: May 19, 2023

(65) Prior Publication Data

US 2024/0381355 A1 Nov. 14, 2024

(30) Foreign Application Priority Data

Nov. 9, 2021 (GR) .............................. 20210100786

(51) Int. Cl.
*H04L 1/00* (2006.01)
*H04W 72/1273* (2023.01)
(Continued)

(52) U.S. Cl.
CPC ....... *H04W 72/1273* (2013.01); *H04L 1/0003* (2013.01); *H04W 72/51* (2023.01); *H04W 72/566* (2023.01)

(58) Field of Classification Search
CPC .......... H04J 50/001; H04J 7/933; H04J 50/20; H04J 50/80; H04W 72/1273;
(Continued)

(56) References Cited

U.S. PATENT DOCUMENTS

2009/0238294 A1* 9/2009 Toyomane ............ H04L 27/368 375/260
2010/0173637 A1* 7/2010 Damnjanovic ....... H04L 5/0037 455/447
(Continued)

OTHER PUBLICATIONS

International Search Report and Written Opinion—PCT/US2022/075206—ISA/EPO—Nov. 29, 2022.

*Primary Examiner* — Andrew Lee
(74) *Attorney, Agent, or Firm* — Harrity & Harrity, LLP

(57) ABSTRACT

Various aspects of the present disclosure generally relate to wireless communication. In some aspects, a first device may determine a first transmission between the first device and a second device, wherein the first device is a low power device associated with an energy harvesting capability. The first device may determine a second transmission between the first device and the second device, wherein the second transmission and the first transmission are separated by a quantity of symbols that satisfies a threshold value. The first device may perform an action on one or more of the first transmission or the second transmission based at least in part on a priority associated with the first transmission or the second transmission, a cost associated with the first transmission or the second transmission, or a battery status associated with the first device. Numerous other aspects are described.

30 Claims, 8 Drawing Sheets

(51) Int. Cl.
*H04W 72/51* (2023.01)
*H04W 72/566* (2023.01)

(58) Field of Classification Search
CPC .. H04W 72/51; H04W 72/566; H04L 1/0003; H04L 1/0015; H04L 27/2601; H04L 1/0007; H04L 1/0009
See application file for complete search history.

(56) References Cited

U.S. PATENT DOCUMENTS

| | | | | |
|---|---|---|---|---|
| 2013/0286952 | A1* | 10/2013 | Ghosh | H04L 5/0073 370/329 |
| 2016/0227483 | A1* | 8/2016 | Wang | H04B 1/0475 |
| 2018/0167224 | A1 | 6/2018 | Brandt | |
| 2018/0167864 | A1* | 6/2018 | Johnston | H04W 4/70 |
| 2019/0166630 | A1* | 5/2019 | Sivakumar | H04W 4/029 |
| 2019/0229792 | A1* | 7/2019 | John Wilson | H04W 72/23 |
| 2019/0230683 | A1 | 7/2019 | Akkarakaran et al. | |
| 2019/0363843 | A1 | 11/2019 | Gordaychik | |
| 2020/0006988 | A1 | 1/2020 | Leabman | |
| 2021/0022090 | A1* | 1/2021 | Hassan | H04W 52/36 |
| 2021/0258974 | A1 | 8/2021 | Hosseini et al. | |
| 2022/0078779 | A1* | 3/2022 | Xu | H02J 50/001 |
| 2022/0116971 | A1* | 4/2022 | Saber | H04L 5/0055 |
| 2022/0354373 | A1* | 11/2022 | Monson | A61B 5/318 |

* cited by examiner

PERFORMING ACTIONS FOR TRANSMISSIONS OF A DEVICE CAPABLE OF ENERGY HARVESTING

CROSS-REFERENCE TO RELATED APPLICATION

This Patent Application is a 371 national stage of PCT Application No. PCT/US2022/075206 filed on Aug. 19, 2022, entitled "PERFORMING ACTIONS FOR TRANSMISSIONS OF A DEVICE CAPABLE OF ENERGY HARVESTING," which claims priority to Greek patent application No. 20210100786, filed on Nov. 9, 2021, entitled "PERFORMING ACTIONS FOR TRANSMISSIONS OF A DEVICE CAPABLE OF ENERGY HARVESTING," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for performing actions for transmissions of a device capable of energy harvesting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first device includes a memory and one or more processors, coupled to the memory, configured to: determine a first transmission between the first device and a second device, wherein the first device is a low power device associated with an energy harvesting capability; determine a second transmission between the first device and the second device, wherein the second transmission and the first transmission are separated by a quantity of symbols that satisfies a threshold value; and perform an action on one or more of the first transmission or the second transmission based at least in part on a priority associated with the first transmission or the second transmission, a cost associated with the first transmission or the second transmission, or a battery status associated with the first device.

In some implementations, a method of wireless communication performed by a first device includes determining a first transmission between the first device and a second device, wherein the first device is a low power device associated with an energy harvesting capability; determining a second transmission between the first device and the second device, wherein the second transmission and the first transmission are separated by a quantity of symbols that satisfies a threshold value; and performing an action on one or more of the first transmission or the second transmission based at least in part on a priority associated with the first transmission or the second transmission, a cost associated with the first transmission or the second transmission, or a battery status associated with the first device.

In some implementations, a non-transitory computer-readable medium storing a set of instructions for wireless communication includes one or more instructions that, when executed by one or more processors of a first device, cause the first device to: determine a first transmission between the first device and a second device, wherein the first device is a low power device associated with an energy harvesting capability; determine a second transmission between the first device and the second device, wherein the second transmission and the first transmission are separated by a quantity of symbols that satisfies a threshold value; and perform an action on one or more of the first transmission or the second transmission based at least in part on a priority associated with the first transmission or the second transmission, a cost associated with the first transmission or the second transmission, or a battery status associated with the first device.

In some implementations, a first apparatus for wireless communication includes means for determining a first transmission between the first apparatus and a second apparatus, wherein the first apparatus is a low power device associated with an energy harvesting capability; means for determining a second transmission between the first apparatus and the second apparatus, wherein the second transmission and the first transmission are separated by a quantity of symbols that satisfies a threshold value; and means for performing an action on one or more of the first transmission or the second transmission based at least in part on a priority associated with the first transmission or the second transmission, a cost associated with the first transmission or the second transmission, or a battery status associated with the first apparatus.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
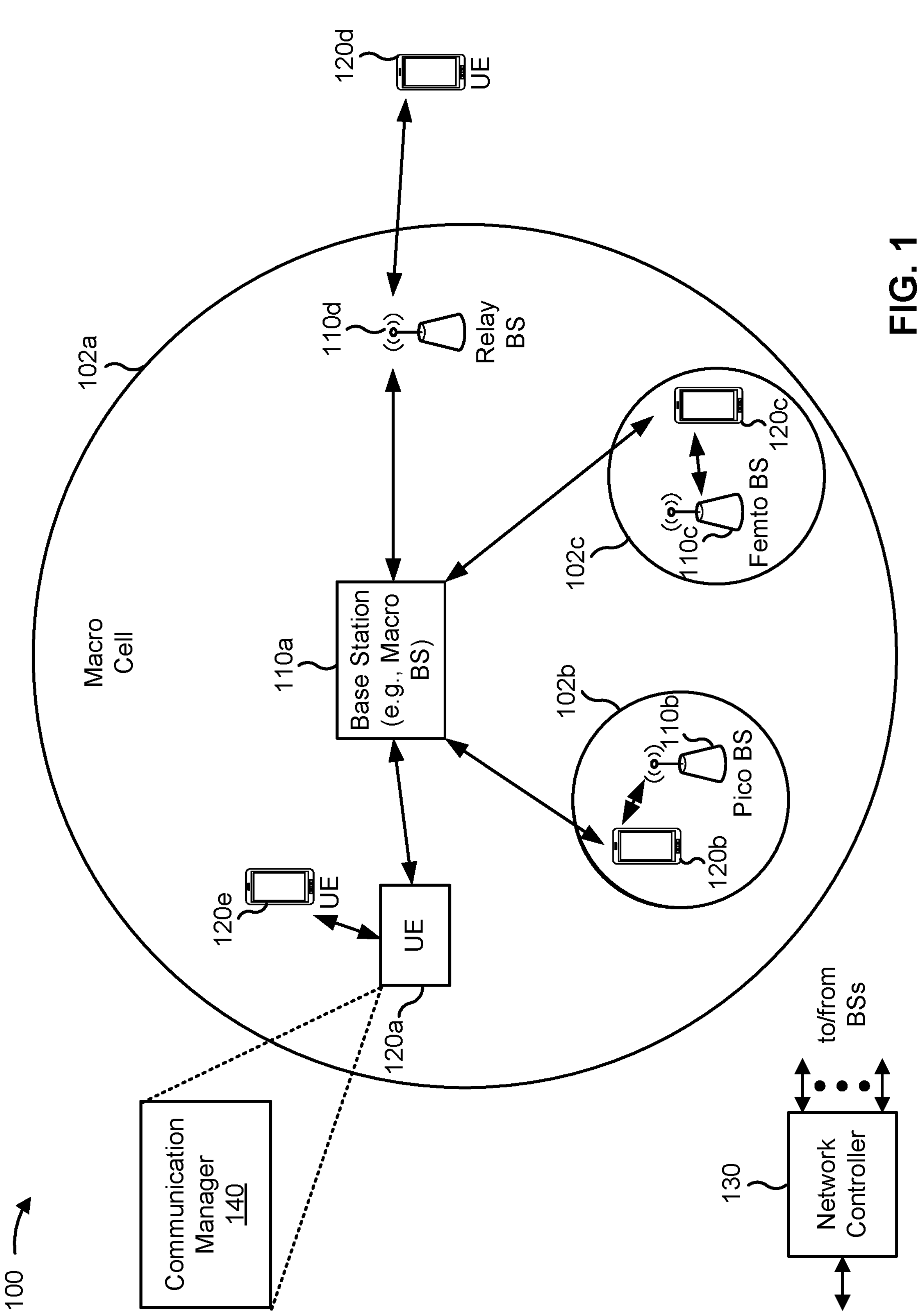
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS

110*d*), a user equipment (UE) 120 or multiple UEs 120 (shown as a UE 120*a*, a UE 120*b*, a UE 120*c*, a UE 120*d*, and a UE 120*c*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrow band IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first device (e.g., UE 120) may include a communication manager 140. As described in more detail elsewhere herein, the communication manager 140 may determine a first transmission between the first device and a second device, wherein the first device is a low power device associated with an energy harvesting capability; determine a second transmission between the first device and the second device, wherein the second transmission and the first transmission are separated by a quantity of symbols that satisfies a threshold value; and perform an action on one or more of the first transmission or the second transmission based at least in part on a priority associated with the first transmission or the second transmission, a cost associated with the first transmission or the second transmission, or a battery status associated with the first device. Additionally, or alternatively, the communication manager 140 may perform one or more other operations described herein.

As indicated above, FIG. 1 is provided as an example. Other examples may differ from what is described with regard to FIG. 1.

Figure 2:
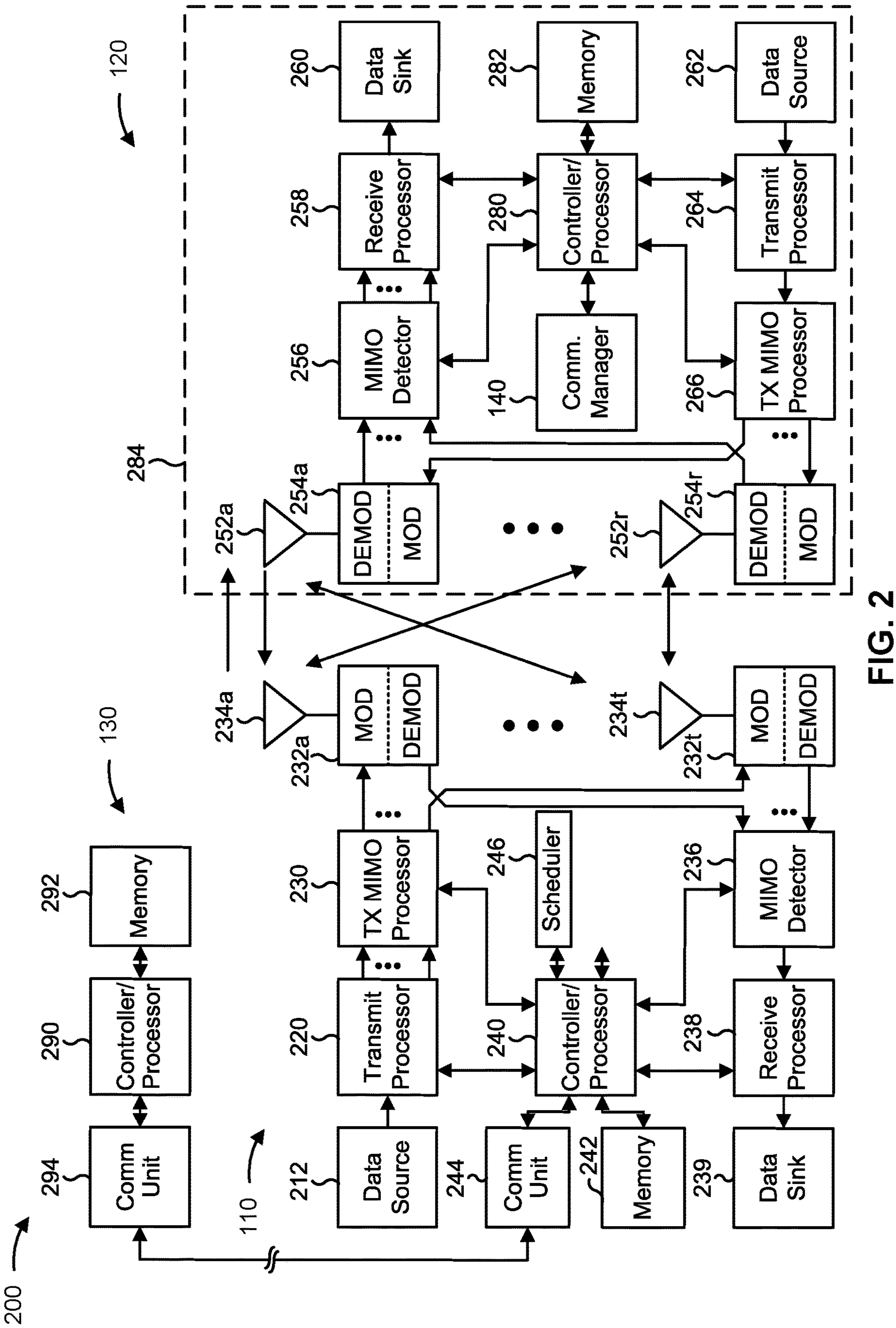
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with performing actions for transmissions of a device capable of energy harvesting, as described in more detail elsewhere herein. In some aspects, the first device described herein is the UE 120, is included in the UE 120, or includes one or more components of the UE 120 shown in FIG. 2. In some aspects, the second device described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a first device (e.g., UE 120) includes means for determining a first transmission between the first device and a second device, wherein the first device is a low power device associated with an energy harvesting capability; means for determining a second transmission between the first device and the second device, wherein the second transmission and the first transmission are separated by a quantity of symbols that satisfies a threshold value; and/or means for performing an action on one or more of the first transmission or the second transmission based at least in part on a priority associated with the first transmission or the second transmission, a cost associated with the first transmission or the second transmission, or a battery status associated with the first device. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Harvesting radio frequency (RF) energy may be used to perform some tasks at a device (e.g., a UE, a wearable device, a smart watch, a low power device), such as data decoding, filter operation, data reception, data encoding, and/or data transmission. A purpose of RF energy harvesting may not be to charge a battery of the device in full, but rather to charge the battery of the device (or to use a dedicated battery for energy harvesting) such that some tasks may be performed using the harvested energy. These tasks may be performed based at least in part on an accumulation of harvested energy over a period of time. The harvested energy may be derived from RF signals transmitted in a network. The device may interact with the network using the harvested energy.

RF energy harvesting may be useful in IoT cases. For example, RF energy harvesting may lead to a longer battery lifespan of an IoT device with a battery. As another example, RF energy harvesting may lead to a battery-less IoT device, such as a medical sensor or an implanted sensor.

An amount of energy that may be harvested from RF signals may be based at least in part a signal frequency, a signal source, a distance traveled by the RF signals, a Tx power associated with the RF signals, and/or an Rx power associated with the RF signals. The signal frequency may be associated with a very high frequency (VHF) or an ultra-high frequency (UHF). The signal source may be a tower or another device, such as a UE.

Energy harvesting may be derived from various sources, such as solar, vibration, thermal, and/or RF. Energy harvesting from a solar source may use photovoltaic cells, and may provide a relatively high power density, but requires exposure to light (not implantable). Energy harvesting from a vibration source may use piezoelectric, electrostatic, and/or electromagnetic techniques, and may be implantable, but may suffer from material physical limitations. Energy harvesting from a thermal source may use a thermoelectric or pyroelectric techniques and may provide a relatively high power density and be implantable, but may produce excess heat. Energy harvesting from RF may use an antenna, and may be implantable, but may provide a relatively low power density where an efficiency is inversely proportional to a distance.

Figure 3:
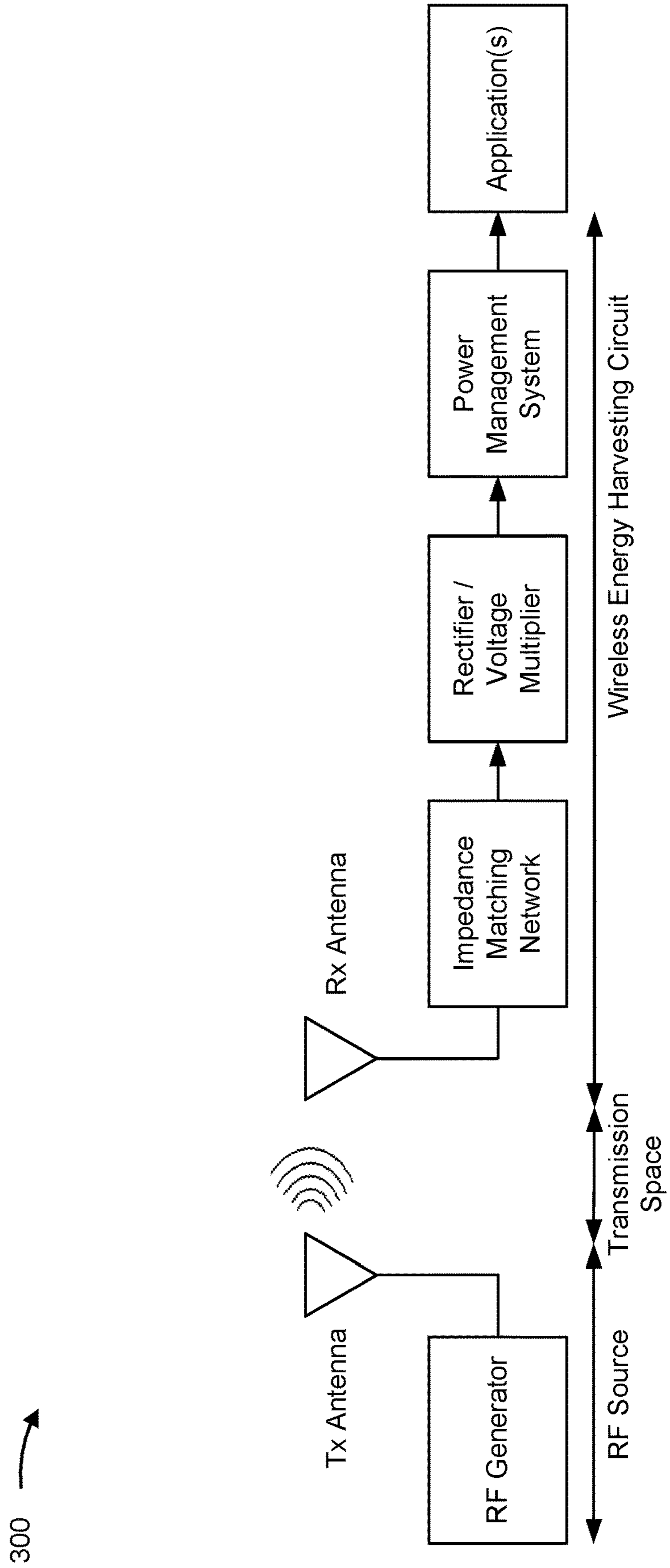
FIG. 3 is a diagram illustrating an example of a radio frequency (RF) energy harvesting system, in accordance with the present disclosure.

FIG. 3 is a diagram illustrating an example 300 of an RF energy harvesting system, in accordance with the present disclosure.

As shown in FIG. 3, an RF generator, acting as an RF source, may generate an RF signal. The RF generator may transmit, via a Tx antenna, the RF signal. The RF signal may be transmitted over a transmission space, and the RF signal may be received at an Rx antenna of a device. The RF signal may be directed to a wireless energy harvesting circuit of the device. The wireless energy harvesting circuit may include an impedance matching network and a rectifier/voltage multiplier, which may be responsible for converting the RF signal to power (e.g., direct current (DC) power). A power management system may be responsible for storing the power, and providing the power to application(s) of the device as needed.

As indicated above, FIG. 3 is provided as an example. Other examples may differ from what is described with regard to FIG. 3.

Figure 4:
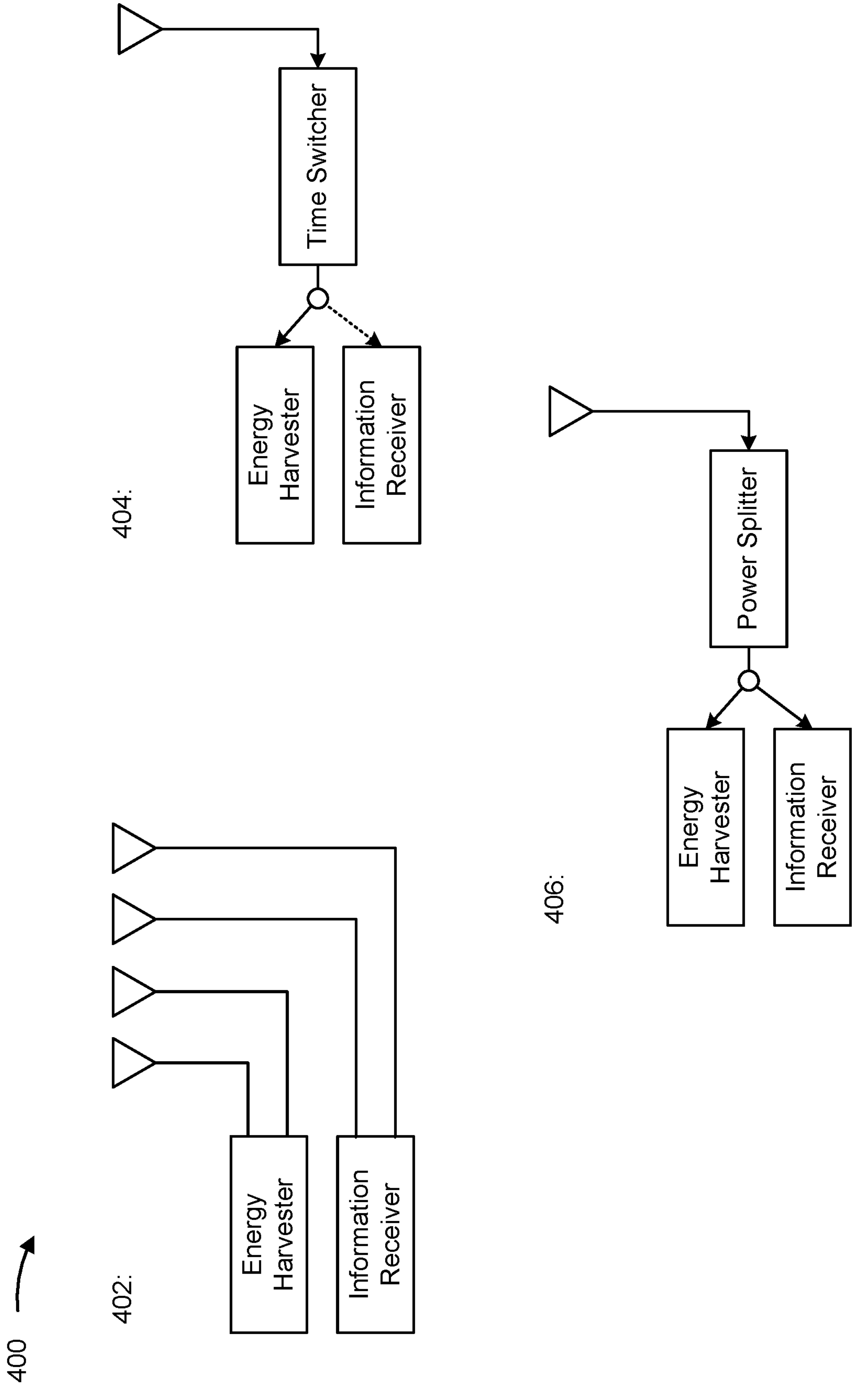
FIG. 4 is a diagram illustrating an example of energy harvesting schemes, in accordance with the present disclosure.

FIG. 4 is a diagram illustrating an example 400 of energy harvesting schemes, in accordance with the present disclosure.

As shown by reference number 402, a separated receiver architecture may be used for energy harvesting. An energy harvester of a device may receive RF signals from a first set of antennas. An information receiver of a device may receive RF signals from a second set of antennas. The energy harvester may function in a simultaneous manner with the information receiver, and received RF signals may be separate for the energy harvester and the information receiver.

As shown by reference number 404, a time switching architecture may be used for energy harvesting. The device may switch between the energy harvester and the information receiver using time switching, with a common antenna shared between the energy harvester and the information receiver. In other words, all RF signals received at the antenna may be directed to the energy harvester when a path is switched to be directed to the energy harvester. On the other hand, all RF signals received at the antenna may be directed to the information receiver when a path is switched to be directed to the information receiver.

As shown by reference number 406, a power splitting architecture may be used for energy harvesting. The common antenna between the energy harvester and the information receiver may receive RF signals, and the received RF signals may be split into two streams for the energy harvester and the information receiver. In other words, a power of the received RF signals may be split between the energy harvester and the information receiver.

As indicated above, FIG. 4 is provided as an example. Other examples may differ from what is described with regard to FIG. 4.

A device, such as an energy harvesting node, may harvest energy from a source of harvesting such as solar, vibration, thermal, RF, etc. The device may be an IoT device, a wearable device, or a UE associated with limited batter and power capabilities. The device may have hardware limits on transmissions or performing transmissions within an interval of time (e.g., consecutive transmissions within a relatively short period of time). Thus, consecutive data transmissions and/or data receptions within the interval of time may not be possible due to the hardware limits associated with the device using the harvested energy.

Further, data receptions and data transmissions may be associated with costs (e.g., power costs) per resource block or per resource element. For encoding data associated with the data transmissions, the costs may be a function of an MCS and a transport block size (TBS). For decoding data associated with the data receptions, the costs may be a function of a decoder number iteration, the MCS, and/or the TBS, energy.

In various aspects of techniques and apparatuses described herein, a first device may determine a first transmission between the first device and a second device. The first device may be a low power device associated with an energy harvesting capability. The first device may determine a second transmission between the first device and the second device. The second transmission and the first transmission may be separated by a quantity of symbols that satisfies a threshold value. The first device may perform an action on one or more of the first transmission or the second transmission based at least in part on a priority associated with the first transmission or the second transmission, a cost associated with the first transmission or the second transmission, or a battery status associated with the first device. In some aspects, the action may involve dropping the first transmission or the second transmission based at least in part on the priority associated with the first transmission or the second transmission, the cost associated with the first transmission or the second transmission, or the battery status associated with the first device. In some aspects, the action may involve multiplexing the first transmission and the second transmission to form a multiplexed transmission, and transmitting, to the second device, the multiplexed transmission in a first occasion associated with the first transmission or a second occasion associated with the second transmission.

In some aspects, the first device may perform the dropping or the multiplexing for two consecutive transmissions or tasks (e.g., data transmissions and/or data receptions) that occur within an interval of time. The interval of time may be a relatively short period of time, and may correspond to the quantity of symbols that satisfies the threshold value. The first device may perform the dropping or the multiplexing in accordance with a set of rules, which may be defined due to hardware limits associated with the device. The set of rules may serve to accommodate the hardware limits associated with the first device, where the hardware limits may be due to battery and power capabilities of the first device. The battery and power capabilities of the first device may be less than normal UEs, since the first device may use harvested energy to perform certain data transmissions and receptions.

Figure 5:
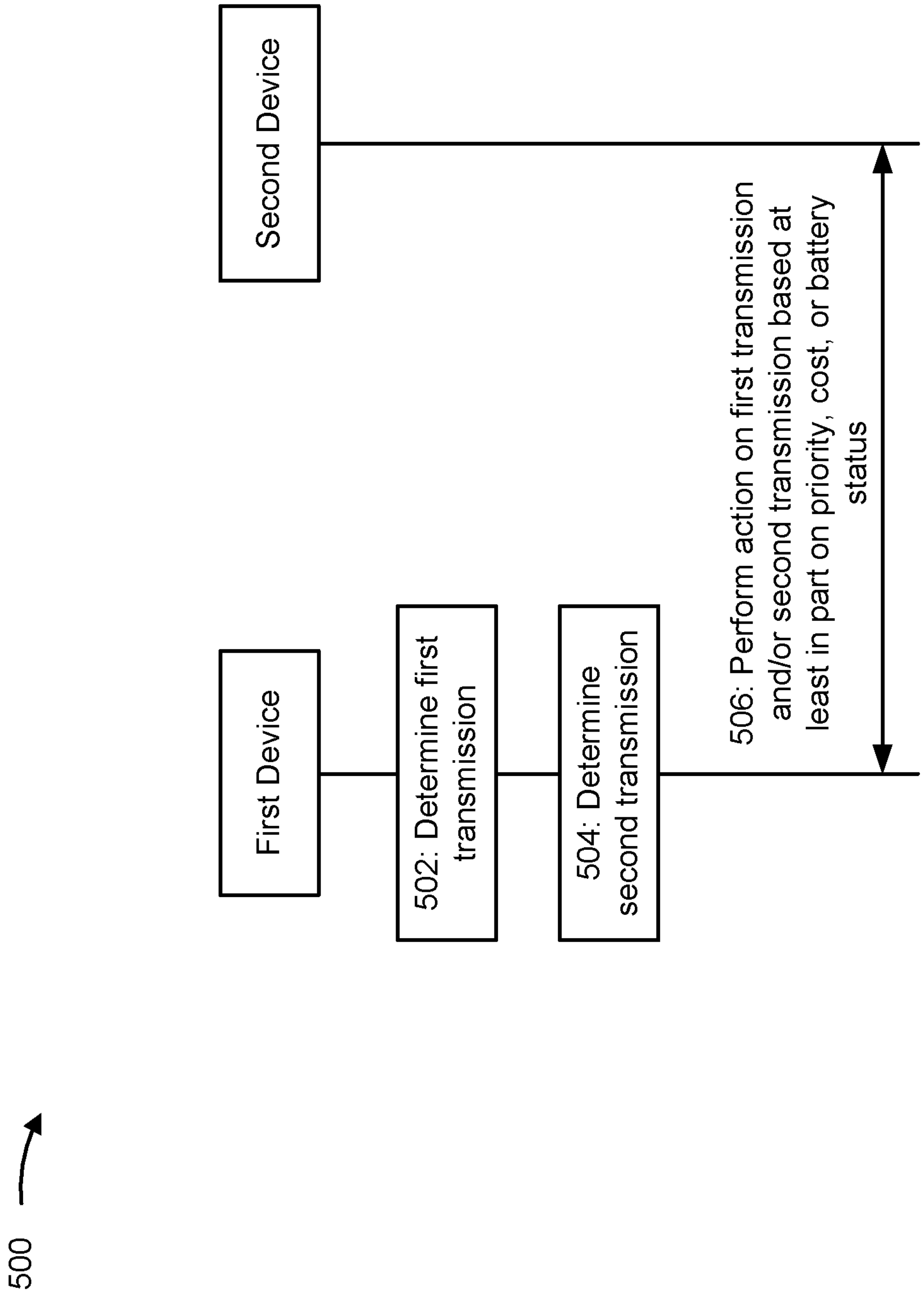
FIGS. 5-6 are diagrams illustrating examples associated with performing actions for transmissions of a device capable of energy harvesting, in accordance with the present disclosure.

FIG. 5 is a diagram illustrating an example 500 associated with performing actions for transmissions of a device capable of energy harvesting, in accordance with the present disclosure. As shown in FIG. 5, example 500 includes communication between a first device (e.g., UE 120*a*) and a second device (e.g., base station 110 or UE 120*e*). In some aspects, the first device and the second device may be included in a wireless network, such as wireless network 100.

As shown by reference number 502, the first device may determine a first transmission between the first device and the second device. The first transmission may be a first downlink transmission, a first uplink transmission, or a first sidelink transmission.

In some aspects, the first device may be a low power device associated with an energy harvesting capability. In some aspects, the first device may be a first IoT device, a first wearable device, or a first UE. In some aspects, the second device may be a base station, a second IoT device, a second wearable device, or a second UE.

As shown by reference number 504, the first device may determine a second transmission between the first device and the second device. The second transmission may be a second downlink transmission, a second uplink transmission, or a second sidelink transmission. The second transmission and the first transmission may be separated by a quantity of symbols that satisfies a threshold value. The threshold value may be based at least in part on radio resource control (RRC) signaling or via a medium access control element (MAC-CE).

In some aspects, the first transmission may be a first physical downlink shared channel (PDSCH) transmission, and the second transmission may be a second PDSCH transmission. In some aspects, the first transmission may be a first physical uplink shared channel (PUSCH) transmission, and the second transmission is a second PUSCH transmission. In some aspects, the first transmission may be a PDSCH transmission, and the second transmission may be a PUSCH transmission or a physical uplink control channel (PUCCH) transmission. In some aspects, the first transmission may be a PUSCH transmission, and the second transmission may be a PUCCH transmission. In some aspects, the first transmission may be a PUCCH transmission, and the second transmission may be a PUSCH transmission. In some aspects, the first transmission may be a first physical sidelink shared channel (PSSCH) transmission, and the second transmission may be a second PSSCH transmission.

As shown by reference number 506, the first device may perform an action on the first transmission and/or the second transmission based at least in part on a priority associated with the first transmission or the second transmission, a cost associated with the first transmission or the second transmission, and/or a battery status associated with the first device. The first device may perform the action using a set of rules, which may be defined based at least in part on priorities associated with transmissions, costs associated with transmissions, and/or battery statuses associated with devices. In some aspects, when performing the action, the first device may drop the first transmission or the second transmission based at least in part on the priority associated with the first transmission or the second transmission, the cost associated with the first transmission or the second transmission, or the battery status associated with the first device. In some aspects, the first device may perform the action based at least in part on the battery status associated with the first device and a predicted energy harvesting at the first device, where the battery status may indicate a remaining battery level of the first device.

In some aspects, when performing the action, the first device may multiplex the first transmission and the second transmission to form a multiplexed transmission, and transmit, to the second device, the multiplexed transmission in a first occasion associated with the first transmission or a second occasion associated with the second transmission. The first occasion or the second occasion may correspond to a PUSCH occasion/allocation. For example, the multiplexed transmission may be transmitted in either the first occasion or the second occasion based at least in part on an availability of energy, or based at least in part on an indication to transmit the multiplexed transmission in one of the first occasion or the second occasion. The multiplexed transmission may be transmitted in either the first occasion or the second occasion when both data (e.g., both the first transmission and the second transmission) is ready to be transmitted.

In some aspects, when performing the action, the first device may modify a power configuration (e.g., reduce a transmission power) of the first transmission and/or the second transmission. For example, the first device may reduce a transmission power of the first transmission, so that the first device is about to transmit both the first transmission and the second transmission without dropping one of the first transmission or the second transmission. In some aspects, the first device may transmit both the first transmission and the second transmission without dropping or multiplexing the first transmission and/or the second transmission, based at least in part on a UE capability. The first device may not perform the dropping or multiplexing, but the first device may modify the power configuration of the first transmission and/or the second transmission in order to transmit both the first transmission and the second transmission.

In some aspects, the cost associated with the first transmission or the second transmission may include a decoding cost, or the cost associated with the first transmission or the second transmission may include an encoding cost and a transmission cost. The cost associated with the first transmission or the second transmission may be based at least in part on an MCS, a TBS, or a quantity of resource elements. In some aspects, the first device may transmit, to the second device, capability signaling that indicates costs per MCS and per TBS, where the costs may include decoding costs and encoding costs.

In some aspects, the first device may indicate costs, such as the decoding costs and the encoding costs, for each MCS, TBS, and in a case of decoding, a number of iterations. The decoding costs may be associated with data receptions (or downlink transmissions), and the encoding costs may be associated with data transmissions (or uplink transmissions). The first device may indicate the costs per MCS, TBS, resource block, and/or resource element as part of the capability signaling or an initial signaling between the first device and the second device. The uplink transmissions may be associated with a transmission power costs in addition to the encoding cost. Values associated with the costs may be predefined, such that each parameter combination cost may be indicated by the first device to the second device. The costs associated with encoding/decoding may be approximate costs, and the costs may be used for dropping or multiplexing consecutive transmissions.

In some aspects, the first device may partially or fully harvest energy associated with the first transmission based at least in part on the energy harvesting capability of the first device. The energy harvesting capability may include a radio frequency or wireless energy harvesting capability. The first device may transmit the second transmission based at least in part on the energy partially or fully harvested from the first transmission.

In some aspects, the first device may receive the first downlink transmission and the second downlink transmission, from two separated or same semi-persistent scheduling (SPS), or between an SPS and a dynamic grant (DG). The first downlink transmission may be associated with the first PDSCH transmission and the second downlink transmission may be associated with the second PDSCH transmission. The first downlink transmission and the second downlink transmission may be separated by X symbols, where X satisfies a threshold (e.g., X is less than the threshold). A value of X may be predefined or may be configured via RRC signaling or via a MAC-CE.

In some aspects, the first device that is receiving the first downlink transmission and the second downlink transmission from the two separated or same SPS or between the SPS and the DG, separated by the X symbols, may drop the first downlink transmission or the second downlink transmission (e.g., the SPS or the DG) based at least in part on a priority of the first downlink transmission versus a priority of the second downlink transmission.

In some aspects, the first device that is receiving the first downlink transmission and the second downlink transmission from the two separated or same SPS or between the SPS and the DG, separated by the X symbols, may drop the first downlink transmission or the second downlink transmission (e.g., the SPS or the DG) based at least in part on a decoding cost associated with the first downlink transmission and the second downlink transmission, where the decoding cost may be based at least in part on an MCS, a TBS, and/or a number of resource elements. The first device may determine the decoding cost associated with the first downlink transmission and the second downlink transmission, and the UE may drop the first downlink transmission or the second downlink transmission based at least in part on the respective decoding costs.

In some aspects, the first device may have an RF/wireless energy harvesting capability. The first device may partially (e.g., via power splitting energy harvesting) or fully harvest energy of the first downlink transmission or the second downlink transmission, depending on which of the first downlink transmission or the second downlink transmission is dropped.

In some aspects, the second device may receive, from the first device, an indication of the battery status of the first device and the predicted energy harvesting at the first device. The second device may multiplex both the first downlink transmission and the second downlink transmission into a first downlink channel occasion (e.g., PDSCH occasion) or a second downlink channel occasion, based at least in part on the indication received from the first device. The second device may multiplex both the first downlink transmission and the second downlink transmission, as opposed to dropping either the first downlink transmission or the second downlink transmission based at least in part on the priority or the decoding cost. The second device may use a relatively small fixed-size TBS with energy harvesting devices, and multiplexing may be feasible for such low size TBSs.

In some aspects, the first device may generate the first uplink transmission and the second uplink transmission. The first uplink transmission may be the first PUSCH transmission and the second uplink transmission may be the second PUSCH transmission. The first uplink transmission and the second uplink transmission may be separated by X symbols, where X satisfies the threshold (e.g., X is less than the threshold). The first device may drop either the first uplink transmission or the second uplink transmission based at least in part on a priority of the first uplink transmission versus a priority of the second uplink transmission. Alternatively, the first device may drop either the first uplink transmission or the second uplink transmission based at least in part on a cost associated with the first uplink transmission and the second uplink transmission. The cost may include an encoding cost and a transmission cost.

In some aspects, the first device may multiplex both the first uplink transmission and the second uplink transmission into a first uplink channel occasion (e.g., PUSCH occasion) or a second uplink channel occasion. The first device may multiplex both the first uplink transmission and the second uplink transmission, as opposed to dropping either the first uplink transmission or the second uplink transmission based at least in part on the priority or the decoding cost. The first device may multiplex both the first uplink transmission and the second uplink transmission based at least in part on an assumption that the second device has received the indication from the first device, where the indication indicates the battery status of the first device and the predicted energy harvesting at the first device.

In some aspects, the first uplink transmission may be the PUSCH transmission, and the second uplink transmission may be the PUCCH transmission. The first uplink transmission and the second uplink transmission may be separated by X symbols, where X satisfies the threshold (e.g., X is less than the threshold). In some aspects, the first device that is performing the first uplink transmission and the second uplink transmission may drop the first uplink transmission and keep the second uplink transmission, based at least in part on a priority of the first uplink transmission versus a priority of the second uplink transmission, or based at least in part on a power or battery level of the first device. In some aspects, the first device that is performing the first uplink transmission and the second uplink transmission may drop the second uplink transmission and keep the first uplink transmission, based at least in part on the priority of the first uplink transmission versus the priority of the second uplink transmission, or based at least in part on a presence of a sufficient power at a battery of the first device.

In some aspects, the first uplink transmission may be the PUCCH transmission, and the second uplink transmission may be the PUSCH transmission. In some aspects, the first device that is performing the first uplink transmission and the second uplink transmission may drop the second uplink transmission and keep the first uplink transmission, based at least in part on the priority of the first uplink transmission versus the priority of the second uplink transmission, or based at least in part on the power or battery level of the first device. In some aspects, the first device that is performing the first uplink transmission and the second uplink transmission may drop the first uplink transmission and keep the second uplink transmission, based at least in part on the priority of the first uplink transmission versus the priority of the second uplink transmission, or based at least in part on the presence of the sufficient power at the battery of the first device.

In some aspects, the first device may multiplex both the first uplink transmission and the second uplink transmission into an uplink channel occasion (e.g., PUSCH occasion), since the uplink channel occasion may be associated with an increased number of resource blocks or a larger resource block allocation as compared to other types of channel occasions. The first device may multiplex both the first uplink transmission and the second uplink transmission, as opposed to dropping either the first uplink transmission or the second uplink transmission based at least in part on the priority or the decoding cost. The first device may multiplex both the first uplink transmission and the second uplink transmission based at least in part on an assumption that the second device has received the indication from the first device, where the indication indicates the battery status of the first device and the predicted energy harvesting at the first device.

In some aspects, the first device may receive a downlink transmission, and the first device may expect to transmit an uplink transmission based at least in part on the downlink transmission. The downlink transmission and the uplink transmission may be separated by X symbols, where X satisfies the threshold (e.g., X is less than the threshold). The downlink transmission may be the PDSCH transmission, and the uplink transmission may be the PUCCH/PUSCH transmission. The first device that is receiving the downlink transmission and is expected to transmit the uplink transmission after the X symbols may drop either the downlink transmission or the uplink transmission. In some aspects, the first device may drop either the downlink transmission or the uplink transmission based at least in part on a priority of the downlink transmission versus a priority of the uplink transmission. In some aspects, the first device may drop either the downlink transmission or the uplink transmission based at least in part on which of the downlink transmission or the uplink transmission consumes a lower energy. In some aspects, the first device may drop either the downlink transmission or the uplink transmission based at least in part on which of the downlink transmission or the uplink transmission are sufficient to be performed (e.g., decoding for the PDSCH transmission or encoding for the PUCCH/PUSCH transmission).

In some aspects, the first device may have the RF/wireless energy harvesting capability. The first device may partially (e.g., via power splitting energy harvesting) or fully harvest energy of the downlink transmission and then perform the uplink transmission using harvested energy.

In some aspects, the first device may perform the first sidelink transmission and the second sidelink transmission. The first sidelink transmission may be the first PSSCH transmission, and the second sidelink transmission may be the second PSSCH transmission. The first sidelink transmission and the second sidelink transmission may be separated by X symbols, where X satisfies the threshold (e.g., X is less than the threshold). The first sidelink transmission and the second sidelink transmission may be associated with two occasions of a PSSCH on a sidelink. The first device may transmit the first sidelink transmission and transmit the second sidelink transmission, the first device may receive the first sidelink transmission and receive the second sidelink transmission, the first device may transmit the first sidelink transmission and receive the second sidelink transmission, or the first device may receive the first sidelink transmission and transmit the second sidelink transmission. In some aspects, the first device may multiplex both the first sidelink transmission and the second sidelink transmission, or drop either the first sidelink transmission or the second sidelink transmission, based at least in part on the battery status of the first device and an ability to transmit/receive sidelink transmissions. The first device may not perform multiplexing or dropping based at least in part on a priority of the first sidelink transmission versus a priority of the second sidelink transmission, since the first device may be unable to determine priorities beforehand in sidelink.

As indicated above, FIG. 5 is provided as an example. Other examples may differ from what is described with regard to FIG. 5.

Figure 6:
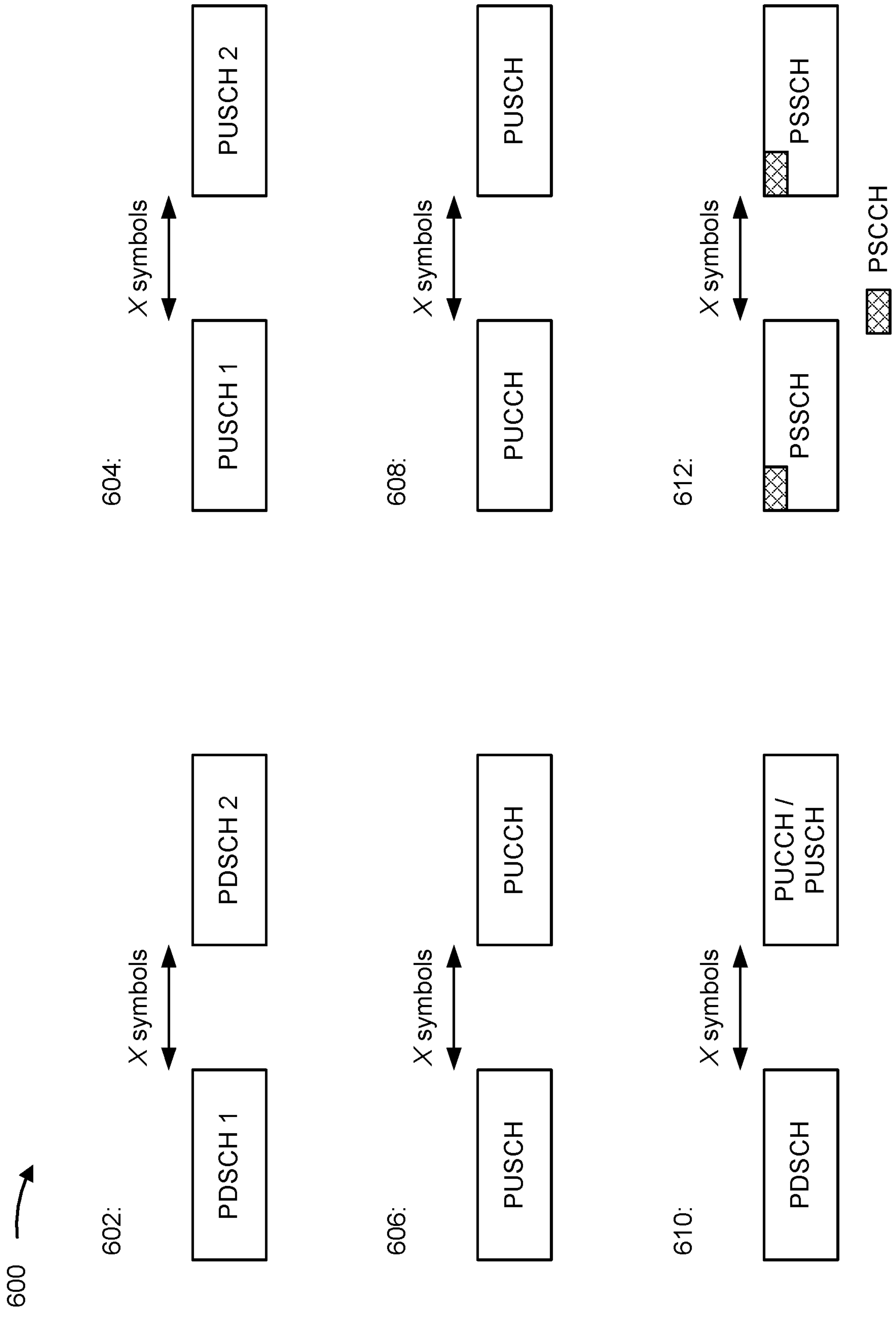

FIG. 6 is a diagram illustrating an example 600 associated with performing actions for transmissions of a device capable of energy harvesting, in accordance with the present disclosure.

As shown by reference number 602, a first device (e.g., an energy harvesting device) that is receiving a first PDSCH transmission and a second PDSCH transmission, which are separated by X symbols where X is less than a threshold, may drop the first PDSCH transmission or the second PDSCH transmission based at least in part on a priority or a decoding cost associated with the first PDSCH transmission and the second PDSCH transmission. Alternatively, a second device may multiplex the first PDSCH transmission and the second PDSCH transmission into a first or second PDSCH occasion.

As shown by reference number 604, a first device (e.g., an energy harvesting device) that is transmitting a first PUSCH transmission and a second PUSCH transmission, which are separated by X symbols where X is less than a threshold, may drop the first PUSCH transmission or the second PUSCH transmission based at least in part on a priority or an encoding/transmission cost associated with the first PUSCH transmission and the second PUSCH transmission. Alternatively, the first device may multiplex the first PUSCH transmission and the second PUSCH transmission into a first or second PUSCH occasion.

As shown by reference number 606, a first device (e.g., an energy harvesting device) that is transmitting a PUSCH transmission and a PUCCH transmission, which are separated by X symbols where X is less than a threshold, may drop the PUSCH transmission and keep the PUCCH transmission based at least in part on a priority or a remaining power/battery level. The PUSCH transmission may occur earlier in time as compared to the PUCCH transmission. In some aspects, the first device may drop the PUCCH transmission and keep the PUSCH transmission based at least in part on the priority or a presence of a sufficient power at a battery of the first device. Alternatively, the first device may multiplex the PUCCH transmission and the PUSCH transmission into a PUSCH occasion, since the PUSCH occasion may be associated with more resource blocks or a larger resource block allocation as compared to a PUCCH occasion.

As shown by reference number 608, a first device (e.g., an energy harvesting device) that is transmitting a PUCCH transmission and a PUSCH transmission, which are separated by X symbols where X is less than a threshold, may drop the PUSCH transmission and keep the PUCCH transmission based at least in part on a priority or a remaining power/battery level. The PUCCH transmission may occur earlier in time as compared to the PUSCH transmission. In some aspects, the first device may drop the PUCCH transmission and keep the PUSCH transmission based at least in part on the priority or a presence of a sufficient power at a battery of the first device. Alternatively, the first device may multiplex the PUCCH transmission and the PUSCH transmission into a PUSCH occasion, since the PUSCH occasion may be associated with more resource blocks or a larger resource block allocation as compared to a PUCCH occasion.

As shown by reference number 610, a first device (e.g., an energy harvesting device) that is receiving a PDSCH transmission and is expected to transmit a PUCCH/PUSCH transmission, which may be X symbols after the PDSCH transmission where X is less than a threshold, may drop either the PDSCH transmission or the PUCCH/PUSCH transmission. The first device may drop either the PDSCH transmission or the PUCCH/PUSCH transmission based at least in part on a priority of each transmission, which transmission consumes less energy, or which transmission is sufficient to be performed.

As shown by reference number 612, a first device (e.g., an energy harvesting device) that is performing a first PSSCH transmission and a second PSSCH transmission, which are separated by X symbols where X is less than a threshold, may drop or multiplex the first PSSCH transmission and/or the second PSSCH transmission based at least in part on a battery status of the first device and an ability to transmit/receive sidelink transmissions.

As indicated above, FIG. 6 is provided as an example. Other examples may differ from what is described with regard to FIG. 6.

Figure 7:
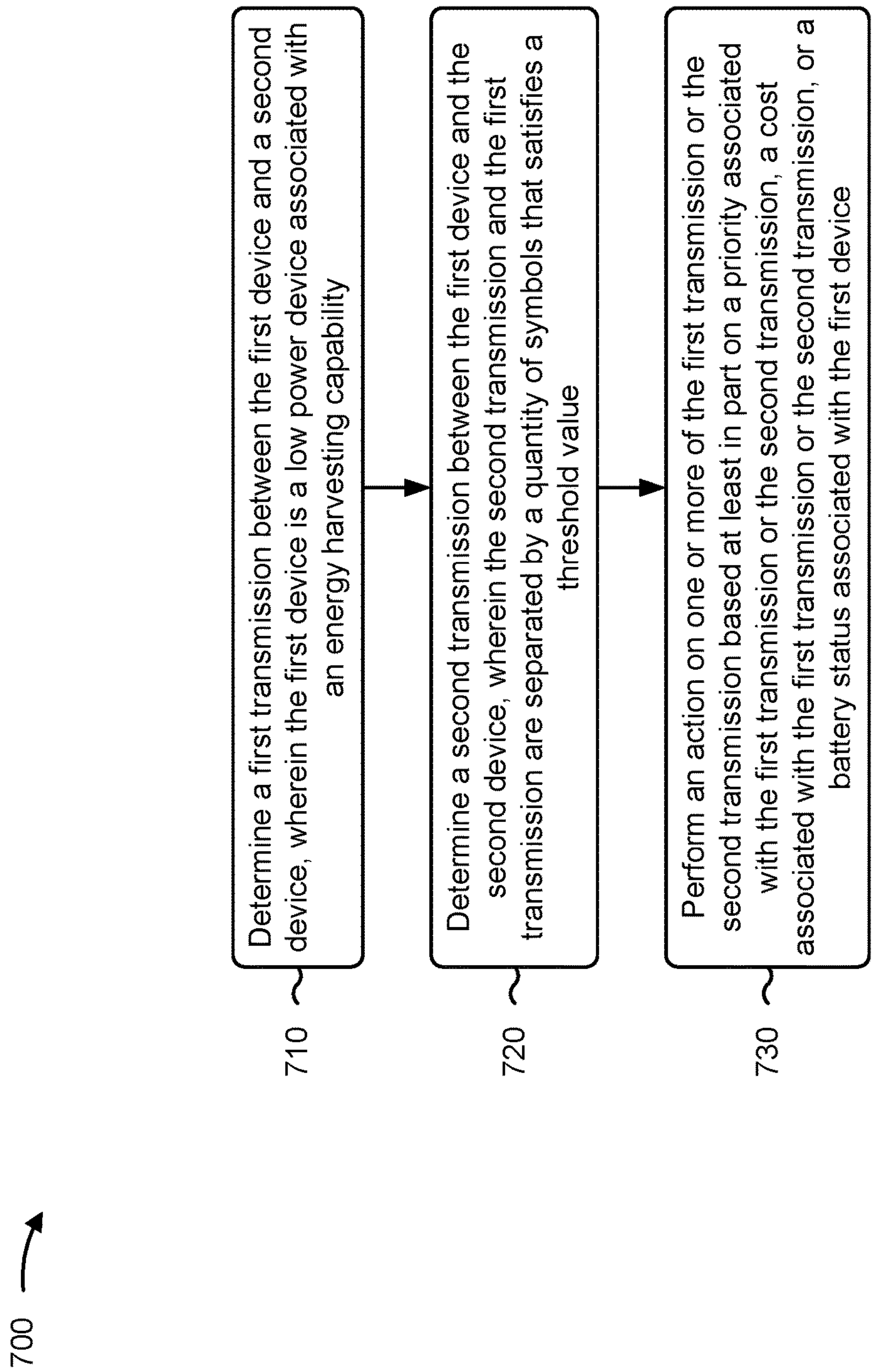
FIG. 7 is a diagram illustrating an example process associated with performing actions for transmissions of a device capable of energy harvesting, in accordance with the present disclosure.

FIG. 7 is a diagram illustrating an example process 700 performed, for example, by a first device, in accordance with the present disclosure. Example process 700 is an example where the first device (e.g., UE 120) performs operations associated with performing actions for transmissions of a device capable of energy harvesting.

As shown in FIG. 7, in some aspects, process 700 may include determining a first transmission between the first device and a second device, wherein the first device is a low power device associated with an energy harvesting capability (block 710). For example, the first device (e.g., using communication manager 140 and/or determination component 808, depicted in FIG. 8) may determine a first transmission between the first device and a second device, wherein the first device is a low power device associated with an energy harvesting capability, as described above in connection with FIGS. 5-6.

As further shown in FIG. 7, in some aspects, process 700 may include determining a second transmission between the first device and the second device, wherein the second transmission and the first transmission are separated by a quantity of symbols that satisfies a threshold value (block 720). For example, the first device (e.g., using communication manager 140 and/or determination component 808, depicted in FIG. 8) may determine a second transmission between the first device and the second device, wherein the second transmission and the first transmission are separated by a quantity of symbols that satisfies a threshold value, as described above in connection with FIGS. 5-6.

As further shown in FIG. 7, in some aspects, process 700 may include performing an action on one or more of the first transmission or the second transmission based at least in part on a priority associated with the first transmission or the second transmission, a cost associated with the first transmission or the second transmission, or a battery status associated with the first device (block 730). For example, the first device (e.g., using communication manager 140 and/or action component 810, depicted in FIG. 8) may perform an action on one or more of the first transmission or the second transmission based at least in part on a priority associated with the first transmission or the second transmission, a cost associated with the first transmission or the second transmission, or a battery status associated with the first device, as described above in connection with FIGS. 5-6.

Process 700 may include additional aspects, such as any single aspect or any combination of aspects described below and/or in connection with one or more other processes described elsewhere herein.

In a first aspect, process 700 includes dropping the first transmission or the second transmission based at least in part on the priority associated with the first transmission or the second transmission, the cost associated with the first transmission or the second transmission, or the battery status associated with the first device.

In a second aspect, alone or in combination with the first aspect, process 700 includes multiplexing the first transmission and the second transmission to form a multiplexed transmission, and transmitting, to the second device, the multiplexed transmission in a first occasion associated with the first transmission or a second occasion associated with the second transmission.

In a third aspect, alone or in combination with one or more of the first and second aspects, the threshold value is based at least in part on RRC signaling or a MAC-CE.

In a fourth aspect, alone or in combination with one or more of the first through third aspects, the cost associated with the first transmission or the second transmission includes a decoding cost, or the cost associated with the first transmission or the second transmission includes an encoding cost and a transmission cost.

In a fifth aspect, alone or in combination with one or more of the first through fourth aspects, the cost associated with the first transmission or the second transmission is based at least in part on an MCS, a TBS, or a quantity of resource elements.

In a sixth aspect, alone or in combination with one or more of the first through fifth aspects, process 700 includes transmitting, to the second device, capability signaling that indicates costs per MCS and per TBS, wherein the costs include decoding costs and encoding costs.

In a seventh aspect, alone or in combination with one or more of the first through sixth aspects, the first transmission is a first PDSCH transmission and the second transmission is a second PDSCH transmission, the first transmission is a first PUSCH transmission and the second transmission is a second PUSCH transmission.

In an eighth aspect, alone or in combination with one or more of the first through seventh aspects, the first transmission is a PUSCH transmission and the second transmission is a PUCCH transmission, the first transmission is a PUCCH transmission and the second transmission is a PUSCH transmission, or the first transmission is a first PSSCH transmission and the second transmission is a second PSSCH transmission, or the first transmission is a PDSCH transmission and the second transmission is a PUSCH transmission or a PUCCH transmission.

In a ninth aspect, alone or in combination with one or more of the first through eighth aspects, process 700 includes modifying a power configuration of one or more of the first transmission or the second transmission.

In a tenth aspect, alone or in combination with one or more of the first through ninth aspects, process 700 includes performing the action based at least in part on the battery status associated with the first device and a predicted energy harvesting at the first device, wherein the battery status indicates a remaining battery level of the first device.

In an eleventh aspect, alone or in combination with one or more of the first through tenth aspects, process 700 includes partially or fully harvesting energy associated with the first transmission based at least in part on the energy harvesting capability of the first device, wherein the energy harvesting capability includes a radio frequency or wireless energy harvesting capability.

In a twelfth aspect, alone or in combination with one or more of the first through eleventh aspects, process 700 includes transmitting the second transmission based at least in part on the energy partially or fully harvested from the first transmission.

In a thirteenth aspect, alone or in combination with one or more of the first through twelfth aspects, the first device is a first IoT device, a first wearable device, or a first UE, and the second device is a base station, a second IoT device, a second wearable device, or a second UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
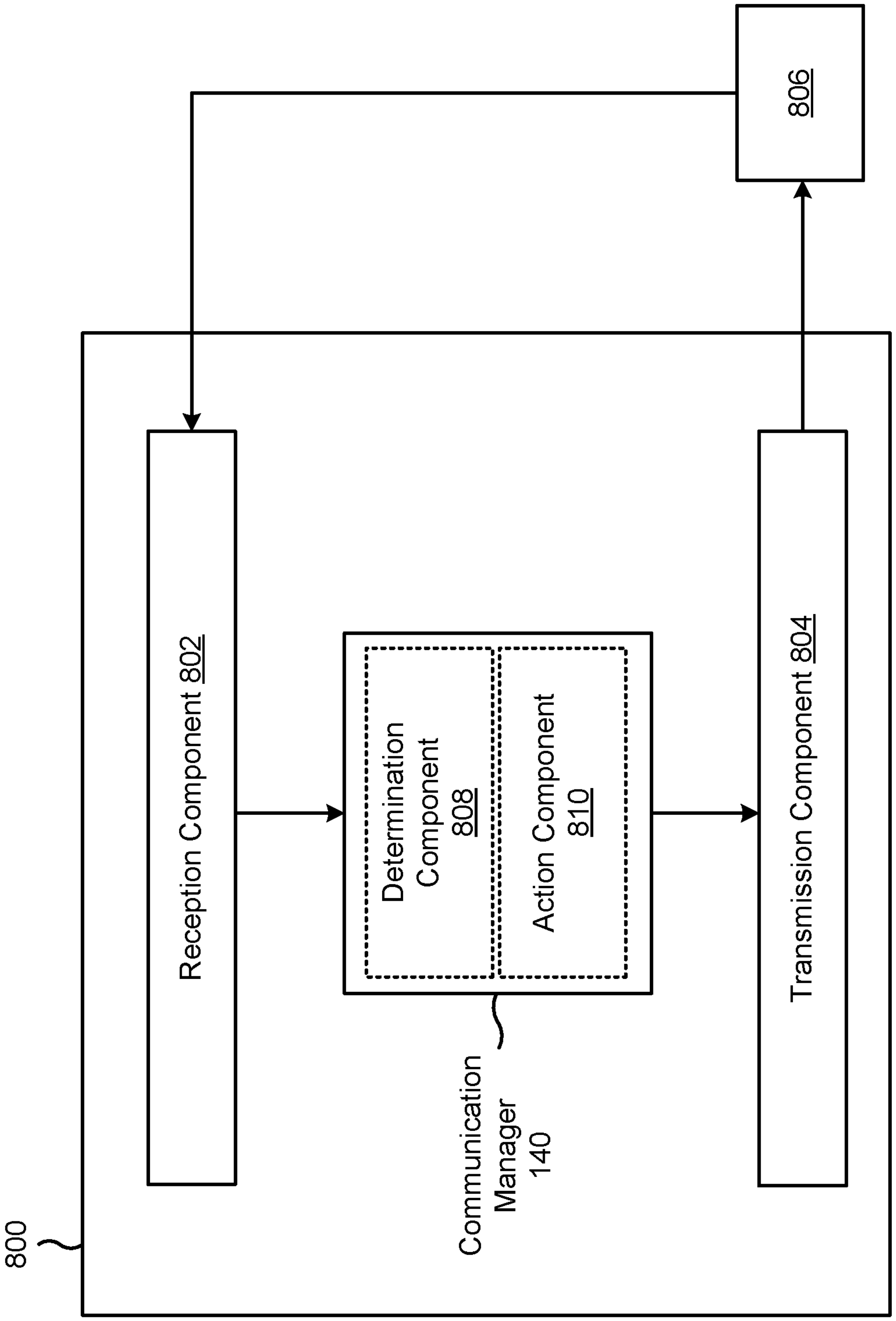
FIG. 8 is a diagram of an example apparatus for wireless communication, in accordance with the present disclosure.

FIG. 8 is a diagram of an example apparatus 800 for wireless communication. The apparatus 800 may be a first device, or a first device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a determination component 808, or an action component 810, among other examples.

In some aspects, the apparatus 800 may be configured to perform one or more operations described herein in connection with FIGS. 5-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the first device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the first device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806, In some aspects, the transmission component 804 may include one or more antennas, a modem, a modulator, a transmit MIMO processor, a transmit processor, a controller/processor, a memory, or a combination thereof, of the first device described in connection with FIG. 2. In some aspects, the transmission component 804 may be co-located with the reception component 802 in a transceiver.

The determination component 808 may determine a first transmission between the first device and a second device, wherein the first device is a low power device associated with an energy harvesting capability. The determination component 808 may determine a second transmission between the first device and the second device, wherein the second transmission and the first transmission are separated by a quantity of symbols that satisfies a threshold value. The action component 810 may perform an action on one or more of the first transmission or the second transmission based at least in part on a priority associated with the first transmission or the second transmission, a cost associated with the first transmission or the second transmission, or a battery status associated with the first device.

The action component 810 may drop the first transmission or the second transmission based at least in part on the priority associated with the first transmission or the second transmission, the cost associated with the first transmission or the second transmission, or the battery status associated with the first device. The action component 810 may multiplex the first transmission and the second transmission to form a multiplexed transmission. The transmission component 804 may transmit, to the second device, the multiplexed transmission in a first occasion associated with the first transmission or a second occasion associated with the second transmission. The transmission component 804 may transmit, to the second device, capability signaling that indicates costs per MCS and per TBS, where the costs include decoding costs and encoding costs. The transmission component 804 may transmit the second transmission based at least in part on energy partially or fully harvested from the first transmission.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first device, comprising: determining a first transmission between the first device and a second device, wherein the first device is a low power device associated with an energy harvesting capability; determining a second transmission between the first device and the second device, wherein the second transmission and the first transmission are separated by a quantity of symbols that satisfies a threshold value; and performing an action on one or more of the first transmission or the second transmission based at least in part on a priority associated with the first transmission or the second transmission, a cost associated with the first transmission or the second transmission, or a battery status associated with the first device.

Aspect 2: The method of Aspect 1, wherein performing the action comprises: dropping the first transmission or the second transmission based at least in part on the priority associated with the first transmission or the second transmission, the cost associated with the first transmission or the second transmission, or the battery status associated with the first device.

Aspect 3: The method of any of Aspects 1 through 2, wherein performing the action comprises: multiplexing the first transmission and the second transmission to form a multiplexed transmission; and transmitting, to the second device, the multiplexed transmission in a first occasion associated with the first transmission or a second occasion associated with the second transmission.

Aspect 4: The method of any of Aspects 1 through 3, wherein the threshold value is based at least in part on radio resource control signaling or a medium access control control element.

Aspect 5: The method of any of Aspects 1 through 4, wherein the cost associated with the first transmission or the second transmission includes a decoding cost, or the cost associated with the first transmission or the second transmission includes an encoding cost and a transmission cost.

Aspect 6: The method of any of Aspects 1 through 5, wherein the cost associated with the first transmission or the second transmission is based at least in part on a modulation and coding scheme (MCS), a transport block size (TBS), or a quantity of resource elements.

Aspect 7: The method of Aspect 6, further comprising: transmitting, to the second device, capability signaling that indicates costs per MCS and per TBS, wherein the costs include decoding costs and encoding costs.

Aspect 8: The method of any of Aspects 1 through 7, wherein: the first transmission is a first physical downlink shared channel (PDSCH) transmission and the second transmission is a second PDSCH transmission; the first transmission is a first physical uplink shared channel (PUSCH) transmission and the second transmission is a second PUSCH transmission; or the first transmission is a PDSCH transmission and the second transmission is a PUSCH transmission or a physical uplink control channel (PUCCH) transmission.

Aspect 9: The method of any of Aspects 1 through 8, wherein: the first transmission is a physical uplink shared channel (PUSCH) transmission and the second transmission is a physical uplink control channel (PUCCH) transmission; the first transmission is a PUCCH transmission and the second transmission is a PUSCH transmission; or the first transmission is a first physical sidelink shared channel (PSSCH) transmission and the second transmission is a second PSSCH transmission.

Aspect 10: The method of any of Aspects 1 through 9, wherein performing the action comprises modifying a power configuration of one or more of the first transmission or the second transmission.

Aspect 11: The method of any of Aspects 1 through 10, wherein performing the action comprises performing the action based at least in part on the battery status associated with the first device and a predicted energy harvesting at the first device, wherein the battery status indicates a remaining battery level of the first device.

Aspect 12: The method of any of Aspects 1 through 11, further comprising: partially or fully harvesting energy associated with the first transmission based at least in part on the energy harvesting capability of the first device, wherein the energy harvesting capability includes a radio frequency or wireless energy harvesting capability.

Aspect 13: The method of Aspect 12, further comprising: transmitting the second transmission based at least in part on the energy partially or fully harvested from the first transmission.

Aspect 14: The method of any of Aspects 1 through 13, wherein the first device is a first Internet of Things (IoT) device, a first wearable device, or a first user equipment (UE), and wherein the second device is a base station, a second IoT device, a second wearable device, or a second UE.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first device, comprising:
- a memory; and
- one or more processors, coupled to the memory, configured to:
  - determine a first transmission between the first device and a second device, wherein the first device is a low power device associated with an energy harvesting capability;
  - determine a second transmission between the first device and the second device, wherein the second transmission and the first transmission are separated by a quantity of symbols that is less than a threshold value; and
  - perform an action on one or more of the first transmission or the second transmission based at least in part on the energy harvesting capability and based at least in part on an encoding cost associated with the first transmission or the second transmission, or a decoding cost associated with the first transmission or the second transmission.

2. The apparatus of claim 1, wherein the one or more processors, to perform the action, are configured to drop the first transmission or the second transmission based at least in part on a priority associated with the first transmission or the second transmission or a battery status associated with the first device.

3. The apparatus of claim 1, wherein the one or more processors, to perform the action, are configured to:
- multiplex the first transmission and the second transmission to form a multiplexed transmission; and
- transmit, to the second device, the multiplexed transmission in a first occasion associated with the first transmission or a second occasion associated with the second transmission.

4. The apparatus of claim 1, wherein the threshold value is based at least in part on radio resource control signaling or a medium access control control element.

5. The apparatus of claim 1, wherein the encoding cost and the decoding cost are based at least in part on a modulation and coding scheme (MCS), a transport block size (TBS), or a quantity of resource elements.

6. The apparatus of claim 5, wherein the one or more processors are further configured to:
- transmit, to the second device, capability signaling that indicates costs per MCS and per TBS.

7. The apparatus of claim 1, wherein:
- the first transmission is a first physical downlink shared channel (PDSCH) transmission and the second transmission is a second PDSCH transmission;
- the first transmission is a first physical uplink shared channel (PUSCH) transmission and the second transmission is a second PUSCH transmission; or the first transmission is a PDSCH transmission and the second transmission is a PUSCH transmission or a physical uplink control channel (PUCCH) transmission.

8. The apparatus of claim 1, wherein:

the first transmission is a physical uplink shared channel (PUSCH) transmission and the second transmission is a physical uplink control channel (PUCCH) transmission;

the first transmission is a PUCCH transmission and the second transmission is a PUSCH transmission; or the first transmission is a first physical sidelink shared channel (PSSCH) transmission and the second transmission is a second PSSCH transmission.

9. The apparatus of claim 1, wherein the one or more processors, to perform the action, are configured to: modify a power configuration of one or more of the first transmission or the second transmission.

10. The apparatus of claim 1, wherein the action is performed based at least in part on a battery status associated with the first device and a predicted energy harvesting at the first device, wherein the battery status indicates a remaining battery level of the first device.

11. The apparatus of claim 1, wherein the one or more processors are further configured to:

partially or fully harvest energy associated with the first transmission based at least in part on the energy harvesting capability of the first device, wherein the energy harvesting capability includes a radio frequency or wireless energy harvesting capability.

12. The apparatus of claim 11, wherein the one or more processors are further configured to:

transmit the second transmission based at least in part on the energy partially or fully harvested from the first transmission.

13. The apparatus of claim 1, wherein the first device is a first Internet of Things (IoT) device, a first wearable device, or a first user equipment (UE), and wherein the second device is a base station, a second IoT device, a second wearable device, or a second UE.

14. A method of wireless communication performed by a first device, comprising:

determining a first transmission between the first device and a second device, wherein the first device is a low power device associated with an energy harvesting capability;

determining a second transmission between the first device and the second device, wherein the second transmission and the first transmission are separated by a quantity of symbols that is less than a threshold value; and performing an action on one or more of the first transmission or the second transmission based at least in part on the energy harvesting capability and based at least in part on an encoding cost associated with the first transmission or the second transmission, or a decoding cost associated with the first transmission or the second transmission.

15. The method of claim 14, wherein performing the action comprises dropping the first transmission or the second transmission based at least in part on a priority associated with the first transmission or the second transmission or a battery status associated with the first device.

16. The method of claim 14, wherein performing the action comprises:

multiplexing the first transmission and the second transmission to form a multiplexed transmission; and transmitting, to the second device, the multiplexed transmission in a first occasion associated with the first transmission or a second occasion associated with the second transmission.

17. The method of claim 14, wherein the threshold value is based at least in part on radio resource control signaling or a medium access control control element.

18. The method of claim 14, wherein the encoding cost and the decoding cost are based at least in part on a modulation and coding scheme (MCS), a transport block size (TBS), or a quantity of resource elements.

19. The method of claim 18, further comprising:

transmitting, to the second device, capability signaling that indicates costs per MCS and per TBS.

20. The method of claim 14, wherein:

the first transmission is a first physical downlink shared channel (PDSCH) transmission and the second transmission is a second PDSCH transmission;

the first transmission is a first physical uplink shared channel (PUSCH) transmission and the second transmission is a second PUSCH transmission; or the first transmission is a PDSCH transmission and the second transmission is a PUSCH transmission or a physical uplink control channel (PUCCH) transmission.

21. The method of claim 14, wherein:

the first transmission is a physical uplink shared channel (PUSCH) transmission and the second transmission is a physical uplink control channel (PUCCH) transmission;

the first transmission is a PUCCH transmission and the second transmission is a PUSCH transmission; or the first transmission is a first physical sidelink shared channel (PSSCH) transmission and the second transmission is a second PSSCH transmission.

22. The method of claim 14, wherein performing the action comprises modifying a power configuration of one or more of the first transmission or the second transmission.

23. The method of claim 14, wherein performing the action comprises performing the action based at least in part on a battery status associated with the first device and a predicted energy harvesting at the first device, wherein the battery status indicates a remaining battery level of the first device.

24. The method of claim 14, further comprising:

partially or fully harvesting energy associated with the first transmission based at least in part on the energy harvesting capability of the first device, wherein the energy harvesting capability includes a radio frequency or wireless energy harvesting capability.

25. The method of claim 24, further comprising:

transmitting the second transmission based at least in part on the energy partially or fully harvested from the first transmission.

26. The method of claim 14, wherein the first device is a first Internet of Things (IoT) device, a first wearable device, or a first user equipment (UE), and wherein the second device is a base station, a second IoT device, a second wearable device, or a second UE.

27. A non-transitory computer-readable medium storing a set of instructions for wireless communication, the set of instructions comprising:

one or more instructions that, when executed by one or more processors of a first device, cause the first device to:

determine a first transmission between the first device and a second device, wherein the first device is a low power device associated with an energy harvesting capability;

determine a second transmission between the first device and the second device, wherein the second transmission and the first transmission are separated by a quantity of symbols that is less than a threshold value; and perform an action on one or more of the first transmission or the second transmission based at least in part on the energy harvesting capability and based at least in part on an encoding cost associated with the first transmission or the second transmission, or a decoding cost associated with the first transmission or the second transmission.

28. A first apparatus for wireless communication, comprising:

means for determining a first transmission between the first apparatus and a second apparatus, wherein the first apparatus is a low power device associated with an energy harvesting capability;

means for determining a second transmission between the first apparatus and the second apparatus, wherein the second transmission and the first transmission are separated by a quantity of symbols that is less than a threshold value; and means for performing an action on one or more of the first transmission or the second transmission based at least in part on the energy harvesting capability and based at least in part on an encoding cost associated with the first transmission or the second transmission, or a decoding cost associated with the first transmission or the second transmission, or a battery status associated with the first apparatus.

29. The non-transitory computer-readable medium of claim 27, wherein the one or more instructions, to cause the first device to perform the action, cause the first device to:

drop the first transmission or the second transmission based at least in part on a priority associated with the first transmission or the second transmission or a battery status associated with the first device.

30. The non-transitory computer-readable medium of claim 27, wherein the one or more instructions, to cause the first device to perform the action, cause the first device to:

multiplex the first transmission and the second transmission to form a multiplexed transmission; and transmit, to the second device, the multiplexed transmission in a first occasion associated with the first transmission or a second occasion associated with the second transmission.

* * * * *